US009135696B2

(12) United States Patent
Feng et al.

(10) Patent No.: US 9,135,696 B2
(45) Date of Patent: Sep. 15, 2015

(54) IMPLANT POSE DETERMINATION IN MEDICAL IMAGING

(71) Applicants: Shaolei Feng, Plainsboro, NJ (US); Shaohua Kevin Zhou, Plainsboro, NJ (US); Gerhard Kleinszig, Forchheim (DE); Rainer Graumann, Hoechstadt (DE)

(72) Inventors: Shaolei Feng, Plainsboro, NJ (US); Shaohua Kevin Zhou, Plainsboro, NJ (US); Gerhard Kleinszig, Forchheim (DE); Rainer Graumann, Hoechstadt (DE)

(73) Assignee: Siemens Aktiengesellschaft, Munich (DE)

( * ) Notice: Subject to any disclaimer, the term of this patent is extended or adjusted under 35 U.S.C. 154(b) by 259 days.

(21) Appl. No.: 13/735,112

(22) Filed: Jan. 7, 2013

(65) Prior Publication Data

US 2013/0177230 A1 Jul. 11, 2013

Related U.S. Application Data

(60) Provisional application No. 61/584,873, filed on Jan. 10, 2012.

(51) Int. Cl.
*G06K 9/00* (2006.01)
*G06T 7/00* (2006.01)

(52) U.S. Cl.
CPC ............ *G06T 7/0012* (2013.01); *G06T 7/0046* (2013.01); *G06T 2207/10116* (2013.01); *G06T 2207/30052* (2013.01)

(58) Field of Classification Search
None
See application file for complete search history.

(56) References Cited

U.S. PATENT DOCUMENTS

| | | | | |
|---|---|---|---|---|
| 2006/0098865 | A1 * | 5/2006 | Yang et al. | 382/159 |
| 2006/0142657 | A1 * | 6/2006 | Quaid et al. | 600/424 |
| 2009/0209884 | A1 * | 8/2009 | Van Vorhis et al. | 600/595 |
| 2011/0317810 | A1 * | 12/2011 | Lee et al. | 378/62 |
| 2012/0106819 | A1 * | 5/2012 | Fernandez Oca | 382/132 |
| 2013/0177230 | A1 * | 7/2013 | Feng et al. | 382/132 |
| 2013/0223740 | A1 * | 8/2013 | Wang et al. | 382/171 |

OTHER PUBLICATIONS

T. Yamazaki et al., "Improvement of depth position in 2-d/3-d registration of knee implants using single-plane fluoroscopy," IEEE Transactions on Medical Imaging, 23(5), pp. 602-612, 2004.

S. Zuffi et al., "A model-based method for the econstruction of total knee replacement kinematics," IEEE Transactions on Medical Imaging, 18(10), pp. 981-991, 1999.

S. L. Feng et al., "Search for the best matching ultrasound frame based on spatial and temporal saliencies published in Progress in Biomedical Optics and Imaging," Proceedings of SPIE, 2011.

* cited by examiner

*Primary Examiner* — Tahmina Ansari

(57) ABSTRACT

The pose of an implant represented in a medical image is determined from the medical image. The x-ray image of the implant is compared to a database of the implant viewed at different poses (e.g., viewed from different directions). The implant pose associated with the best match indicates the pose of the implant in the x-ray image.

20 Claims, 4 Drawing Sheets

34

30

32

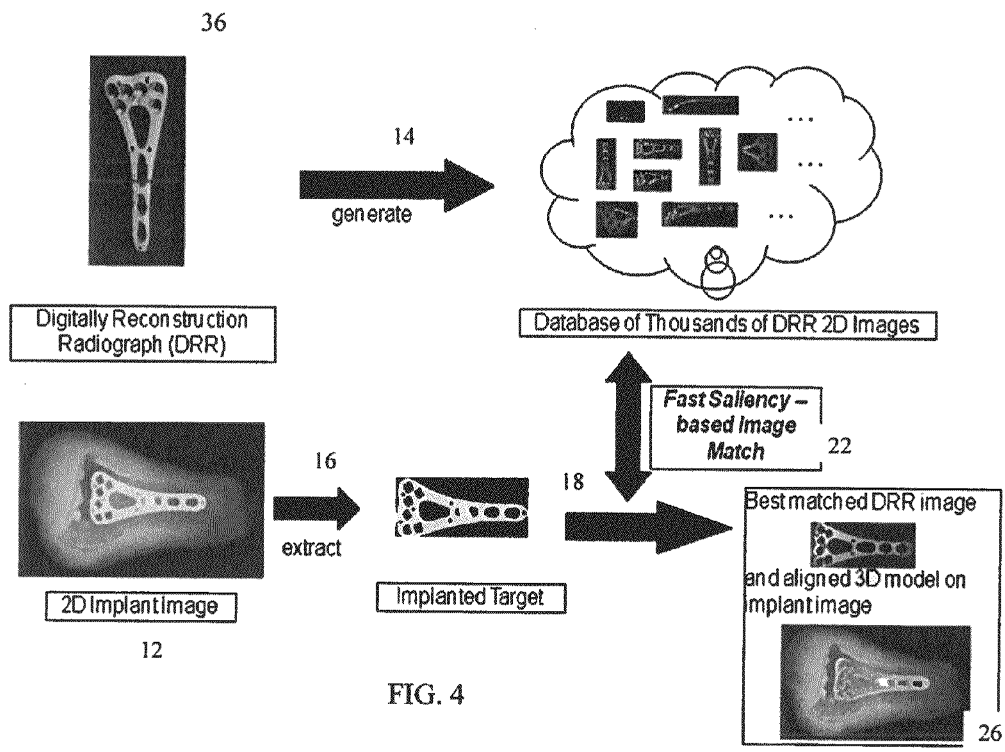
FIG. 4
FIG. 5A
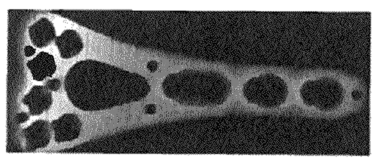
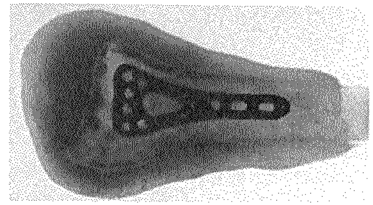
FIG. 5B
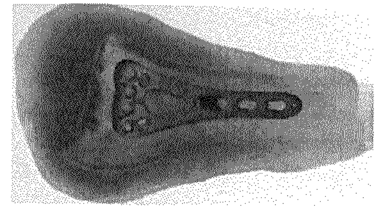
FIG. 5C

FIG. 6A
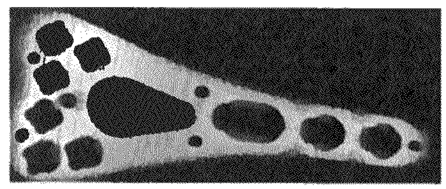
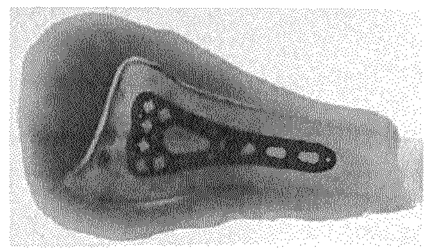
FIG. 6B
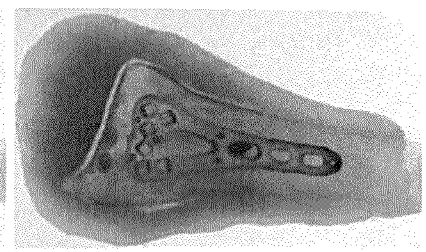
FIG. 6C
FIG. 7A
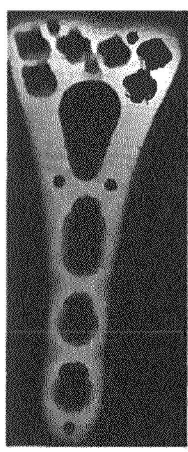
FIG. 7B
FIG. 7C
FIG. 8A
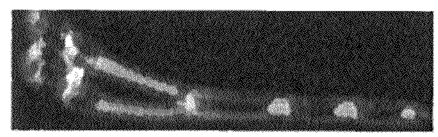
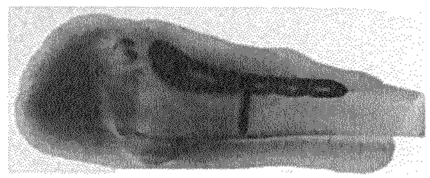
FIG. 8B
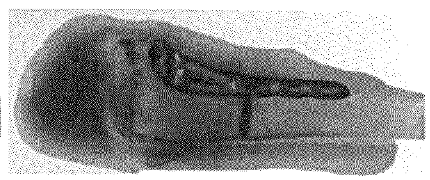
FIG. 8C

IMPLANT POSE DETERMINATION IN MEDICAL IMAGING

RELATED APPLICATIONS

The present patent document claims the benefit of the filing date under 35 U.S.C. §119(e) of Provisional U.S. Patent Application Ser. No. 61/584,873, filed Jan. 10, 2012, which is hereby incorporated by reference.

BACKGROUND

The present embodiments relate to medical imaging of an implant. Metallic implants are used to replace degenerative joints or support disabled bones. For example, a physician implants a metallic component (i.e., an implant) in a patient undergoing knee arthroplasty. The implant replaces the patient's knee joint.

In many applications of implants, kinematics analysis of the abnormal joints or bones helps the success of the implant. To obtain the kinematics information, a three-dimensional (3D) model of the implant device is aligned with a sequence of X-ray images. The alignment provides accurate pose (e.g., orientation) estimates of the implant in the body, allowing the physician to monitor seating and performance of the implant. FIG. 1 shows a 3D model 36 of an implant. FIG. 2 shows an X-ray image 32 of the implant 30 relative to bone 34.

In one alignment approach, the model's 36 occluding contour is aligned with the x-ray silhouette in the two-dimensional x-ray image. Iterative closest point (ICP) is used to align the contour with the silhouette. ICP relies on accurate detection of edges of the silhouette in the x-ray image. However, ICP is not robust where outlier candidates exist. While relatively more absorbing of x-rays, identification of the implant in the x-ray image may be complicated due to bone or other x-ray absorptive objects.

BRIEF SUMMARY

By way of introduction, the preferred embodiments described below include methods, systems, instructions, and computer readable media for determining implant pose. The x-ray image of the implant is compared to a database of a model of the implant viewed at different poses (e.g., viewed from different directions). The implant pose associated with the best match indicates the pose of the implant in the x-ray image.

In a first aspect, a method is provided for determining implant pose. Data representing an implant is segmented from an x-ray image. The segmented data representing the implant is compared with a model of the implant in different poses relative to an x-ray source. A match of the segmented data representing the implant to a first one of the different poses of the model of the implant is identified. The match is identified based on the comparing. The implant pose is determined from the first pose of the model of the implant.

In a second aspect, a non-transitory computer readable storage medium has stored therein data representing instructions executable by a programmed processor for determining implant pose. The storage medium includes instructions for segmenting an implant portion of an x-ray image, searching a database of radiographic reconstructions of a representation of an implant, the radiographic reconstructions corresponding to different views of the representation of the implant, matching the implant portion with a first radiographic reconstruction of the radiographic reconstructions from the database, and determining the implant pose within the x-ray image based on a first view of the different views associated with the first radiographic reconstruction.

In a third aspect, a system is provided for aligning a three-dimensional model of an implant with a view of the implant in a medical image. A memory stores two-dimensional x-ray image representations of the implant from different directions. A processor is configured to select a first one of the different directions as a function of similarities between an x-ray image of the implant and the two-dimensional x-ray image representations of the implant.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 4 is a graphical representation of another embodiment of a method for determining implant pose;

FIGS. 5A-C, 6A-C, 7A-C and 8A-C show examples of an x-ray reconstruction of a model of an implant (A), an x-ray image of the implant (B), and the model aligned and overlaid with the x-ray image (C)

DETAILED DESCRIPTION OF THE DRAWINGS AND PRESENTLY PREFERRED EMBODIMENTS

A three-dimensional (3D) model of an implant is aligned with a medical image of the implant. The alignment may be used to verify position during implantation and/or for subsequent examinations.

A database-driven approach is used for the alignment of a two-dimensional (2D) implant image with the 3D model. A database of 2D X-ray fluoroscopy image reconstructions or estimates of the 3D implant model at a large pool of candidate poses is used. The reconstructions are created to be similar in appearance to real or actual captured 2D X-ray observations. The generation of the 2D image database is performed offline for efficiency. By searching through the database, a fast search of the best match with an actual image is identified. The search and resulting alignment are performed online or when desired.

In one embodiment, a candidate of the implanted component is extracted from the input 2D X-ray frame. This candidate is matched to the model images of the database. The best match is identified using a saliency-based global match. Saliency-based matching may be more robust to outlier points caused by other structures (e.g. bone's edge) in the X-ray frame because of the global match.

Figure 1:
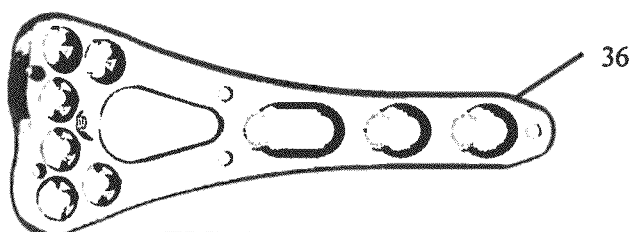
FIG. 1 shows a view of an example implant model.
Figure 2:
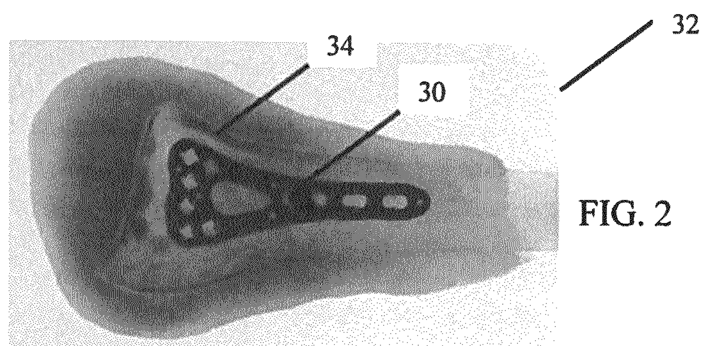
FIG. 2 is an example x-ray image of the implant modeled in FIG. 1.
Figure 3:
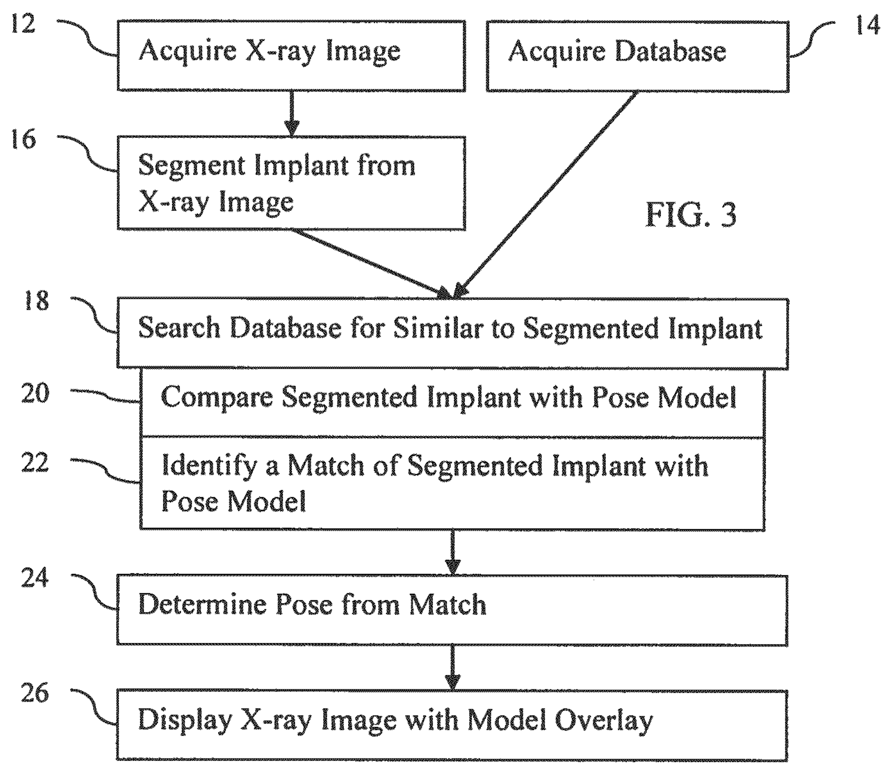
FIG. 3 is a flow chart diagram of one embodiment of a method for determining implant pose.

FIG. 3 shows a flow chart of a method for determining implant pose. The method is implemented by the system of FIG. 9 or another system. For example, the method is implemented on a computer or processor associated with or part of an x-ray or fluoroscopy imaging system. As another example, the method is implemented on a picture archiving and communications system (PACS) workstation or server.

Another embodiment of the method is shown in FIG. 4. FIG. 4 illustrates a workflow for the alignment of the 3D implant model with a 2D X-ray frame. The method is implemented as described for FIG. 3 or differently.

Using the method of FIG. 3, FIG. 4, or another method, a pose of the implant in a medical image of the patient is determined. The pose is the position, orientation (e.g., rotation), and/or scale of the implant in the medical image. Using the pose, the model of the implant may be overlaid on the x-ray image. Kinematics may be analyzed. Other uses of the pose information may be provided.

The acts are performed in the order shown or other orders. Additional, different, or fewer acts may be provided. For example, the method is performed without acquiring the database in act 14, such as where the database already exists. Similarly, the x-ray image may already exist. As another example, the comparison of act 20 is performed between the pose model and the x-ray image without the segmenting of act 16. The display of act 26 is optional. The comparison and identifying of acts 20 and 22 may be combined into one matching act.

The acts are performed in the order shown or a different order. Act 14 is performed prior to act 12, such as where the database is pre-loaded. Alternatively, act 14 is provided simultaneously or after act 12, such as accessing the database in act 14 as needed once the x-ray image is acquired in act 12.

In act 12, one or more x-ray images are acquired. The x-ray image is a medical image. A diagnostic or therapeutic image is generated by a medical imaging system, such as an x-ray or fluoroscopy system.

The medical image is a frame of data representing the patient. The data may be in any format. While the term "image" is used, the image may be in a format prior to actual display of the image. For example, the medical image may be a plurality of scalar values representing different locations in a Cartesian or polar coordinate format the same as or different than a display format. As another example, the medical image may be a plurality red, green, blue (e.g., RGB) values to be output to a display for generating the image in the display format. The medical image may be currently or previously displayed image in the display or other format.

As an x-ray image, the various pixels or intensities represent projection of the x-rays through the object. As x-rays propagate through the object, the tissues and/or other objects along the propagation path absorb different amounts of the x-rays. A detector detects the intensity, energy, or power of the x-rays after passing along a path through the object. By detecting in a 2D plate or detector, a 2D x-ray image is obtained. The projection compresses the information from the 3D object into a 2D representation. Values are provided for each of multiple locations distributed in two dimensions. The medical image is acquired as a frame of data. The frame of data represents the patient at a given time or period.

The object includes tissue, bone, and at least part of the implant 30. The medical image represents the x-ray absorption of these objects within the patient.

In act 14, a database is acquired. The database is acquired by loading, accessing, transfer, and/or creation. For example, an already created database is acquired by accessing a memory that stores the database, by loading the database from a storage location, and/or by transfer (e.g., receiving) in response to a query.

The database is created offline or prior to use for any given patient. The same database is used for different patients at different times. Different databases are created for different implants 30.

The database includes a plurality of two-dimensional representations of a model 36 of the implant. The model 36 is a computer assisted design (CAD), programmed, scanned, imaged, or other representation of the implant in 3D. The model defines the spatial extent or surfaces of the implant. The model may include other information, such as the material, x-ray scattering, and/or x-ray absorbency characteristics.

For matching, the model 36 is used to reconstruct medical images. For example, digitally reconstructed radiographs (DRRs) of the 3D implant model 36 are generated. Any DRR process or program may be used, such as the DRR component of the InsightTookKit (ITK). The DRRs represent what an x-ray of the model 36 would look like without actually imaging or x-raying the implant 30. Alternatively, actual x-ray images of the implant 30 are acquired and used in the database as images of the model 36. The x-rays are from implantation in other patients or of the implant 30 without being in a patient.

Multiple representations of the model 36 of the implant 30 are created and acquired. The different representations are of different poses of the model 26. For example, representations of x-ray fluoroscopy of the model 36 are generated as viewed from different directions. The scale is the same, but the viewing directions are different. Alternatively, different scale is provided. Any number of different poses may be used, such as tens, hundreds, thousands, or tens of thousands. In one embodiment, the model 36 is viewed from different directions in 15 degree step sizes around three axes (e.g., x, y, and z). This provides for 13,824 different representations (e.g., DRRs) of images of the implant 30.

The acquired database is of emulated or representative 2D X-ray fluoroscopy images generated on pre-defined candidate poses. Representative images of how the implant 30 would look when viewed from different directions or poses are provided using the model 36.

In act 16, data representing the implant 30 is segmented from the x-ray image 32. The portion of the x-ray image 32 representing the implant 30 is identified and/or isolated from other portions of the x-ray image 32. The segmentation is of just the implant 30 or of a region extending beyond or surrounding the implant 30. For example, FIG. 4 represents extraction by segmentation of just the data representing the implant 30. The data representing bone or tissue is not included in the segment. In other embodiments, the segmentation includes tissue or bone information as exact segmentation may be required or provided.

Any segmentation may be used to extract the data representing the implant 30 from the x-ray frame. In one embodiment, low-level or simpler processes may be used. Since the implant 30 likely has a strong difference in x-ray absorption, has little texture, is likely uniform, and/or the segmentation does not need to be exact, more simplistic segmentation may be used. For example, the x-ray image is thresholded. The threshold level is selected to isolate a dark region, such as associated with greater x-ray absorption.

Some bone or other objects may include dark areas, so a connected component analysis or low pass filtering is performed. The largest connected region from the pixels remaining after the thresholding is located. The area associated with groups of pixels all connected to each other is determined. The largest area is the implant 30. Other processes may be used, such as identifying shapes or directional filtering.

More complex segmentation may be performed. For example, the patient may have multiple implants or tools and/or noise caused by the shadow of bones may be in the x-ray image. To distinguish the implant of interest or deal with noise, segmentation other than thresholding, filtering, and/or connected component analysis may be used.

In one embodiment, a machine-trained detector is applied to detect and segment the implant 30. Machine-training may be used to train a detector to deal with the likely scenario, such as training a detector in implant detection with strong bone shadowing or for specific applications (e.g., knee implants). Any machine learning may be used, such as a neural network, Bayesian classifier, or probabilistic boosting tree. Cascaded and/or hierarchal arrangements may be used. Any discriminative input features may be provided, such as Haar wavelets or steerable features.

The data representing the implant 30 is extracted from the x-ray image. By removing the data not representing the implant 30, the data is extracted. Alternatively, the data is selected and used while other data of the x-ray image is not. The extraction does not require accurate segmentation or detection due to the use in matching. Since the extracted data is matched with emulated imaging, exact segmentation is not needed, but may be provided.

In act 18, the database is searched. The search is for the radiographic reconstruction of the representation of the implant 30 that best reflects the implant 30 in the x-ray image 32. The database includes different radiographic reconstructions of the model or other representation of the implant 30. These different reconstructions are reviewed to identify a match in act 22. The match is identified by comparison in act 20 of the representation of the implant 30 in the x-ray image with the representations of the implant 30 in the database. Once the implant 30 is extracted from the x-ray frame, the search compares the extracted data with the images of the database in act 20 to find a match in act 22.

In act 20, the segmented data from the actual x-ray image is compared with the representation of the model 36 of the implant 30. The model of the implant 30 is represented, in different poses, in the database. The segmented data is compared to the reconstructed images of the model 36 in the different poses relative to the x-ray source.

The comparison is made by calculating a level of similarity. Any measure of similarity may be used. For example, an amount of correlation is calculated. As another example, a minimum sum of absolute differences is calculated.

To compare, the scale is set. The segmented data is scaled to the same scale as the representations of the model, or the representations of the model are scaled to the same scale as the segmented data. Using the scanning or x-ray parameters, the area associated with each pixel of the segmented data is known. Since the representations of the model are generated from the model, the scale is known. For comparison, the scales are set to be the same or similar.

In one embodiment, the comparison or level of similarity is weighted. For example, some aspects of the data are weighted more or less heavily relative to others. One or more locations may be deemed more reliable indicators of the implant 30, so the difference, data, or other aspect of similarity is weighted more heavily compared to other locations.

In saliency-based global matching, more salient features are identified. The locations of the more salient features are weighted more heavily. For example, the minimum sum of absolute differences determines a difference in intensity for each location between two frames (e.g., the segmented data and the model representation). The differences are then summed. The difference for one location are weighted more (e.g., 0.6) than other locations (e.g., 0.4) for the sum.

Any function may be used for determining saliency. Edges, gradients, shapes, patterns, or other distinguishing features are identified by image processing. The identification is in the x-ray image, such as the segmented data. Alternatively, the identification is in the frame of data reconstructed from the model.

In one embodiment, saliency is determined by directionally filtering the segmented data at different scales. Any number of directions may be used, such as directionally filtering in three different directions. Any number of scales may be used, such as two or more. For example, the data is decimated by a factor of two. The output of the decimation is used for one scale and the original data is used for the other scale. The amount or sum of differences between the directionally filtered data at different scales is determined. For example, the directionally filtered data at the ½ scale is differenced from the directionally filtered data at the full scale. The greater differences are the salient features. The comparison is weighted based on the differences from the salient calculation.

Saliency-based matching may be robust and fast for comparing two images. Rather than treating all the pixels equally during comparison, the saliency-based comparison algorithm calculates a saliency map of the input image to give more weight to the pixels which are more visually prominent and important.

The comparison is performed between the segmented data and each of a plurality of reconstructions from the model at different poses. The comparison is performed for all or fewer than all the frames or images of the database. The comparison is performed for all or fewer than all the possible poses or poses represented in the database.

No, one, or more approaches may be used to limit the number of comparisons. In one embodiment, the user indicates a range of possible poses. Images or frames from the database associated with poses outside the range are not compared. In another embodiment, a coarse-to-fine search strategy is implemented. For example, three poses at 90 degrees to each other (e.g., one pose orthogonal to the xy plane, one orthogonal to the xz plane, and one pose orthogonal to the yz plane) are compared to the segmented data. The most similar of the three is used to refine the search to a range. Similar coarse-to-fine sampling may be repeated for finer and finer searching of the available poses. Starting from a large step size of the orientation angles in the search space, the search range of the angles and the search step size are gradually reduced based on the comparison to localize the best match.

Based on the comparative amounts of similarity, the combination with the most similarity is identified. The match corresponds to the representation of the model with the greatest similarity (e.g., most correlation) or least difference from the segmented data. Due to the different poses, one of the representations of the model should be most similar to the segmented data representing the implant 30 at a particular pose for the x-ray image. Where two or more comparisons have the same or equal amount of similarity that is more than all others, an interpolation of pose or other selection is used. Based on the comparison, a best match is identified.

Where the level of similarity is weighted by saliency, the resulting match more heavily relies on salient features. For example, the holes of the implant 30 may be salient features, so holes in similar locations and sizes for the segmented data and the representations of the model 36 contribute more greatly to finding a match. The best matched x-ray fluoroscopy image reconstructed from the 3D model 36 is identified from the database.

In act 24, the pose of the implant relative to the x-ray frame or image is determined. The pose of the representation of the 3D model 36 providing the best or sufficient match to the segmented data indicates the pose of the implant 30 in the x-ray image. The pose is the same. The pose may be modified, such as interpolating or extrapolating the pose of the implant 30 in the x-ray image based on the closest matches. The identification of the match indicates the view angle of the x-ray source to the implant 30. The same view angles are likely to provide the best matches. The implant pose is determined as the pose of the representation of the implant 30 based on the radiographic reconstruction.

Since the implant 30 is rigid, a rigid transform based on rotation is used to find the pose. Different rotations are tested based on resulting reconstruction comparison to the actual x-ray data. Translation and/or scaling may be performed to compare. Non-rigid transforms may be used, such as where the implant is deformable. The non-rigid transform determines the level of similarity while providing for deformation. Any cost function for the deformation may be used, such as a cost function based on characteristics of the implant 30.

The pose aligns the model 36 with the x-ray image 32. The orientation of the implant in the x-ray image 32 is used to align the 3D model 36. The 3D model 36 at the same orientation aligns with the x-ray image 32. In addition to rotational alignment, the position and scale are aligned.

The alignment may allow further modeling, such as determining kinematics based on the pose. The alignment may be used by a physician to determine proper placement of the implant.

In act 26, an image is displayed. The image is displayed on a display of a medical imaging system, such as an x-ray or fluoroscopy system. Alternatively, the image is displayed on a workstation, computer or other device. The image may be stored in and recalled from a PACS memory.

The image is an x-ray or fluoroscopy image. Other types of medical images may be used. The image is based on the x-ray frame or data used for segmenting. The frame of data with or without segmentation is displayed. Other images may alternatively be used.

The image includes the 3D model. For example, an overlay is rendered from the 3D model. The overlay is positioned at the location of the implant in the medical image. The rendering of the overlay replaces the data at the appropriate locations. Alternatively, the overlay is blended with the data of the x-ray image at the appropriate locations.

Due to the overlay, details of the implant not otherwise easily distinguished in the medical image may be more easily viewed. The overlay is posed in the same way as the imaged implant, so represents the implant at the same viewing angle relative to the x-ray source.

FIGS. 5A-C, 6A-C, 7A-C, and 8A-C represent different examples of the same implant at different poses for the x-ray frame. The implant is metallic and is for connection with one or more bones, such as for insertion into a bone. FIGS. 5B, 6B, 7B, and 8B show an x-ray image of the implant in a patient in four different poses. The implant is angled differently relative to the source of x-rays in each of the images.

The same 3D model and corresponding database of DRRs is used for the different poses. For the database generation, 13,824 reconstructions are pre-defined and created with angle step sizes of 15 degree for each of the x-, y- and z-axes. The reconstructions are created by projecting the 3D model at the candidate orientations and emulating x-ray interaction. FIGS. 5A, 6A, 7A, and 8A show the reconstructions of the 3D model posed the same as in FIGS. 5B, 6B, 7B, and 8B. The database includes reconstructions at other poses.

The implanted component is extracted from the 2D X-ray frames using image thresholding and connected component analysis. The database is searched to locate the matching reconstruction, such as the reconstructions shown in FIGS. 5A, 6A, 7A, and 8A. Once identified, the reconstruction or other rendering from the 3D model in the matching pose is overlaid or added to the x-ray image, such as shown in FIGS. 5C, 6C, 7C, and 8C. FIGS. 5C, 6C, 7C, and 8C show the x-ray image as aligned with the 3D model.

Figure 9:
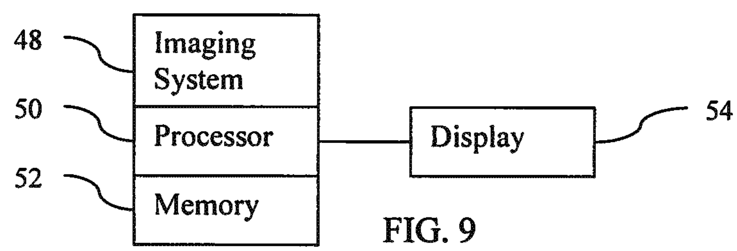
FIG. 9 is one embodiment of a system for determining implant pose.

FIG. 9 shows a system for aligning a three-dimensional model of an implant with a view of the implant in a medical image. The system includes an imaging system 48, a memory 52, a processor 50, and a display 54. Additional, different, or fewer components may be provided. For example, a network or network connection is provided, such as for networking with a medical imaging network or data archival system. In another example, a user interface is provided.

The processor 50, memory 52, and/or display 54 are part of a medical imaging system 48. Alternatively, the processor 50, memory 52 and/or display 54 are part of an archival and/or image processing system, such as associated with a medical records database workstation or server. In other embodiments, the processor 50, memory 52, and display 54 are a personal computer, such as desktop or laptop, a workstation, a server, a network, or combinations thereof. The processor 50, display 54, and memory 52 may be provided without other components for acquiring data by scanning a patient (e.g., without the imaging system 48).

The imaging system 48 is a medical diagnostic imaging system. Ultrasound, computed tomography (CT), x-ray, fluoroscopy, positron emission tomography, single photon emission computed tomography, and/or magnetic resonance (MR) systems may be used. The imaging system 48 may include a transmitter and includes a detector for scanning or receiving data representative of the interior of the patient.

In one embodiment, the imaging system 48 is an x-ray or fluoroscopy system. An x-ray source transmits x-rays directed at a detector. The object, such as the patient with the implant, is positioned between the x-ray source and the detector. The detected x-ray energy passing through the patient is converted or transformed into data representing different spatial locations in a detection plane. Each location represents absorption or passing of x-rays projected along a path from the x-ray source to the point on the detector.

The memory 52 is a graphics processing memory, a video random access memory, a random access memory, system memory, cache memory, hard drive, optical media, magnetic media, flash drive, buffer, database, combinations thereof, or other now known or later developed memory device for storing an x-ray frame or frames data, a 3D model, and/or reconstructions of the 3D model. The memory 52 is part of the imaging system 48, part of a computer associated with the processor 50, part of a database, part of another system, a picture archival memory, or a standalone device.

The memory 52 stores data representing the implant within the patient and surrounding tissue, such as storing detected x-ray intensity. The x-ray data represents a projection through the patient. The scanned or imaged region is of any part of the patient, such as a region within the chest, abdomen, leg, head, arm, cardiac system, heart, vessel, or combinations thereof. The data is from scanning the region by the imaging system 48.

The memory 52 stores a collection of renderings of the 3D model of the implant from different viewing angles or poses relative to the x-ray source. The renderings are reconstructed from the model as if responsive to x-rays (e.g., digital reconstructed radiographs). Two-dimensional x-ray image representations of the implant from different directions are stored for comparison with actual x-ray data. Any number, such as at least one thousand, of the representations are created and stored, each associated with a different pose. Alternatively, the rendering does not emulate x-ray imaging of the modeled implant, but are actual images with known pose used in the database.

The memory 52 may alternatively or additionally store data during processing. The stored data may be a saliency map, segment information, extracted implant data, measures of similarity, matches, pose information, or other information discussed herein.

The memory 52 or other memory is alternatively or additionally a non-transitory computer readable storage medium storing data representing instructions executable by the programmed processor 50 for determining implant pose. The instructions for implementing the processes, methods and/or techniques discussed herein are provided on non-transitory computer-readable storage media or memories, such as a cache, buffer, RAM, removable media, hard drive, or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 50 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for segmentation, searching, pose matching, and/or determining a pose. The processor 50 is a single device or multiple devices operating in serial, parallel, or separately. The processor 50 may be a main processor of a computer, such as a laptop or desktop computer, or may be a processor for handling some tasks in a larger system, such as in an imaging system. The processor 50 is configured by instructions, design, hardware, and/or software to perform the acts discussed herein.

The processor 50 is configured to extract a portion of the x-ray image corresponding to the implant. Any extraction may be used, such as segmenting based on thresholding, edge detection, pattern matching, applying machine-learnt detector, or other image processing.

The processor is configured to match the extracted implant data to one of a plurality of reconstructions or representations of a 3D model in the memory 52. The representations are associated with different viewing directions, so are different. The representation most similar to the extracted portion is identified. The matching may be weighted, such as weighting based on saliency. The processor 50 is configured to generate a saliency map, such as by identifying one or more locations more likely associated with the implant (e.g., edges). The saliency map is used to weight the selection of the match. The matching is based, at least in part, more on the salient features than on other features. The similarities between the x-ray image of the implant and the two-dimensional x-ray image representation of the implant are determined. A best or sufficient match is identified. The matching representation is selected.

The matching representation corresponds to a viewing direction. Based on the match, the processor 50 determines the viewing direction. The best match indicates the viewing direction to be used. The viewing direction is used to align the 3D model to the x-ray image.

The display 54 is a monitor, LCD, projector, plasma display, CRT, printer, or other now known or later developed devise for outputting visual information. The display 54 receives images, graphics, text, quantities, or other information from the processor 50, memory 52, or imaging system 48.

One or more medical images are displayed. The images are of a region of the patient including the implant. A perspective view or rendering of the 3D model at the identified pose or from the identified viewing direction is included in the image. The 3D model information is overlaid, added to, or integrated into the x-ray image.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for determining implant pose, the method comprising: segmenting data representing an implant in a patient from an x-ray image of the patient; comparing the segmented data representing the implant with representations in a database of representations of a model of the implant, the representations being compared with the segmented data each being of the model of the implant in different poses relative to an x-ray source; identifying a match of the segmented data representing the implant to a first one of the different poses of the model of the implant, the match identified based on the comparing; determining the implant pose in the x-ray image of the patient from the first pose of the model of the implant.

2. The method of claim 1 wherein segmenting comprises thresholding the x-ray image and locating a largest connected region from the pixels remaining after the thresholding.

3. The method of claim 1 wherein segmenting comprises applying a machine-trained detector.

4. The method of claim 1 wherein segmenting comprises segmenting from the x-ray image, the x-ray image comprising a projection to an image plane.

5. The method of claim 1 wherein comparing comprises calculating a similarity of the segmented data representing the implant with the model in the different poses.

6. The method of claim 1 wherein comparing comprises comparing the segmented data representing the implant with the model in the different poses comprising digital reconstruction radiographs of the model.

7. The method of claim 1 wherein comparing comprises saliency-based global matching.

8. The method of claim 7 wherein saliency-based global matching comprises:

directionally filtering the segmented data at different scales;

determining differences between the segmented data at the different scales; and weighting the comparing as a function of the differences.

9. The method of claim 1 wherein identifying the match comprises identifying the first pose as more similar to the segmented data than others of the different poses.

10. The method of claim 1 wherein comparing and identifying are performed in a coarse-to-fine search pattern.

11. The method of claim 1 wherein determining the implant pose comprises aligning the x-ray image with the model.

12. The method of claim 1 further comprising:

displaying the x-ray image with an overlay of the model, the overlay of the model being in the first pose.

13. A non-transitory computer readable storage medium having stored therein data representing instructions executable by a programmed processor for determining implant pose, the storage medium comprising instructions for: segmenting an implant portion of an x-ray image; searching a database of radiographic reconstructions for a representation of an implant, the radiographic reconstructions corresponding to different views of the representation of the implant; matching the implant portion with a first radiographic reconstruction of the radiographic reconstructions from the database where the matching is closer for the first radiographic reconstruction than for others of the radiographic reconstructions of others of the different views; and determining the implant pose within the x-ray image based on a first view of the different views associated with the first radiographic reconstruction.

14. The non-transitory computer readable storage medium of claim 13 wherein segmenting comprises extracting a portion of the x-ray image representing the implant.

15. The non-transitory computer readable storage medium of claim 13 wherein searching comprises searching in a coarse-to-fine search pattern for performing the matching.

16. The non-transitory computer readable storage medium of claim 13 wherein matching comprises matching weighted by saliency of the implant portion of the x-ray image.

17. The non-transitory computer readable storage medium of claim 13 wherein determining comprises determining the implant pose as a pose of the representation of the implant in the first radiographic reconstruction.

18. A system for aligning a three-dimensional model of an implant with a view of the implant in a medical image, the system comprising:

a memory storing two-dimensional x-ray image representations of the implant from different directions; and a processor configured to select a first one of the different directions as a function of similarities between an x-ray image of the implant and each of different ones of the two-dimensional x-ray image representations of the implant, the first direction selected for one of the x-ray image representation with a greater similarity.

19. The system of claim 18 wherein the processor is configured to extract a portion of the x-ray image corresponding to the implant, determine saliency of the portion, and weight the selection based on the saliency.

20. The system of claim 18 wherein the memory stores at least one thousand of the two-dimensional x-ray image representations of the implant, the two-dimensional x-ray image representations comprising digital reconstruction radiographs.

* * * * *